Sept. 17, 1963 J. B. CATALDO ETAL 3,104,276
THROUGH-BOLT JOINT FOR BUS DUCT
Filed June 2, 1959 6 Sheets-Sheet 1
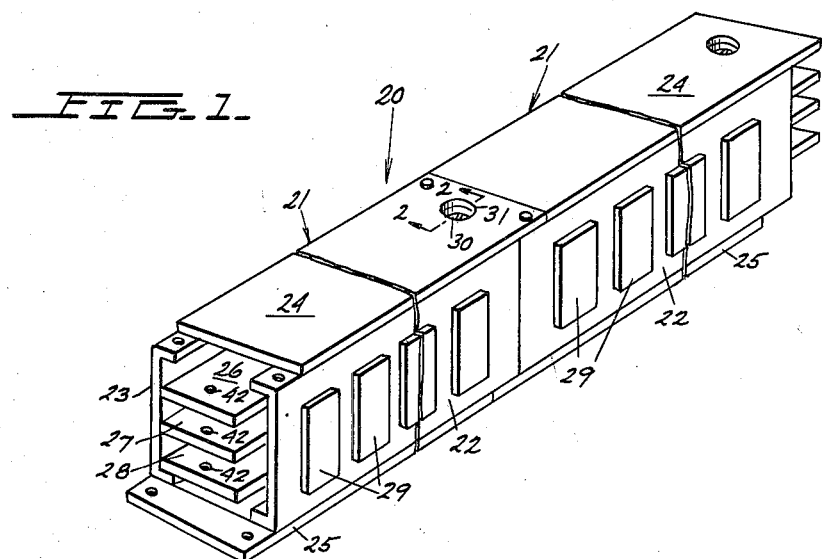
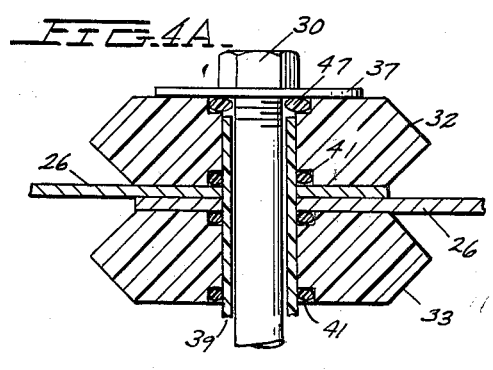
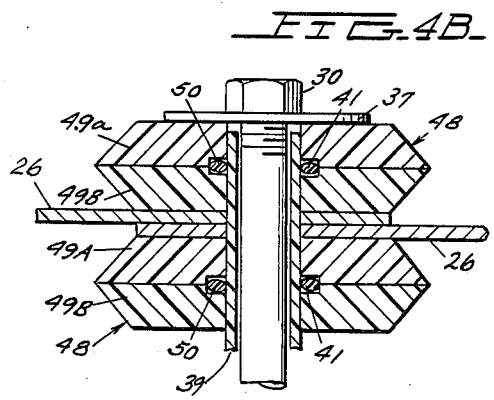
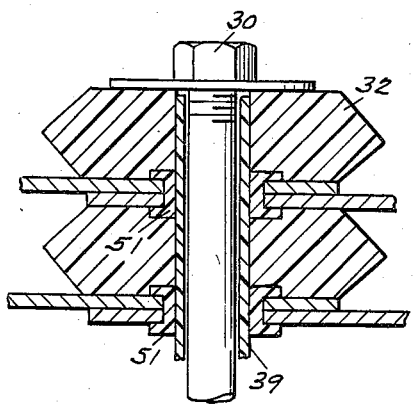
INVENTORS
JOHN B. CATALDO
NORMAN SHACKMAN
BY
ATTORNEYS Sept. 17, 1963　　　J. B. CATALDO ETAL　　　3,104,276
THROUGH-BOLT JOINT FOR BUS DUCT
Filed June 2, 1959　　　　　　　　　　　　　　　　6 Sheets-Sheet 2

INVENTORS
JOHN B. CATALDO
NORMAN SHACKMAN
BY
ATTORNEYS

Sept. 17, 1963 J. B. CATALDO ETAL 3,104,276
THROUGH-BOLT JOINT FOR BUS DUCT
Filed June 2, 1959 6 Sheets-Sheet 3

INVENTORS
JOHN B. CATALDO
NORMAN SHACKMAN
BY
Ostrolenk, Faber,
Gerb & Soffen
ATTORNEYS

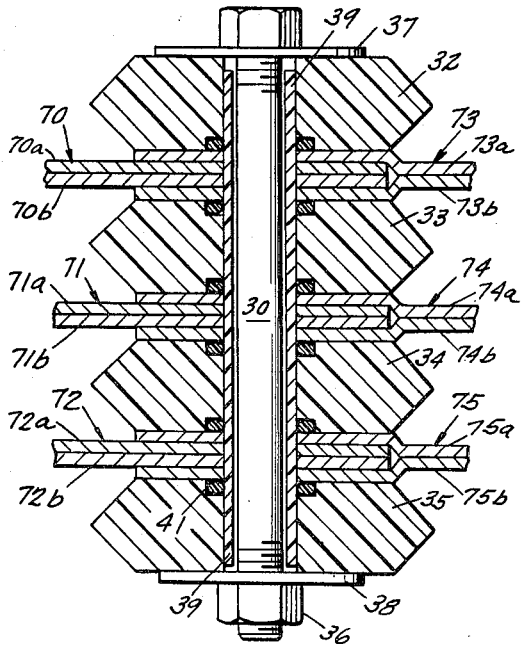
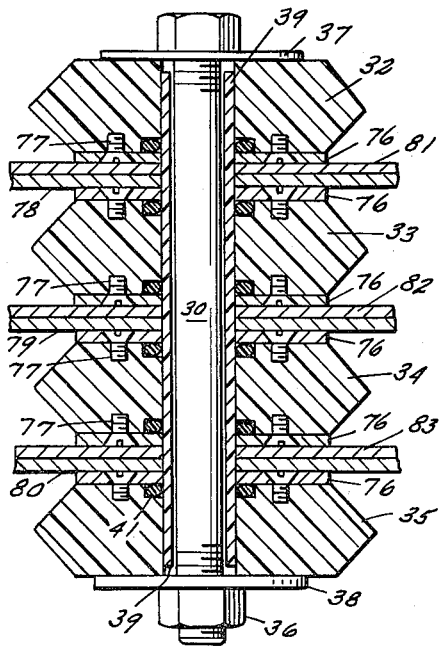
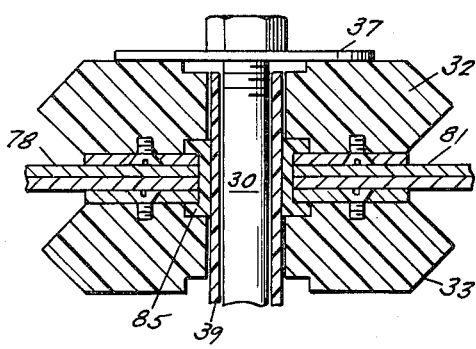
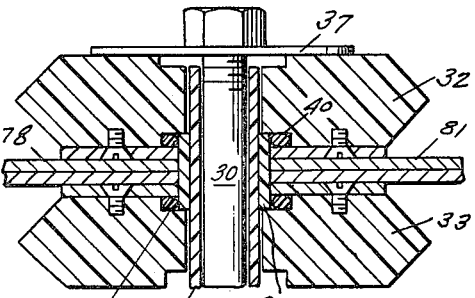
INVENTORS
JOHN B. CATALDO
NORMAN SHACKMAN
BY
ATTORNEYS Sept. 17, 1963 J. B. CATALDO ETAL 3,104,276
THROUGH-BOLT JOINT FOR BUS DUCT
Filed June 2, 1959 6 Sheets-Sheet 5
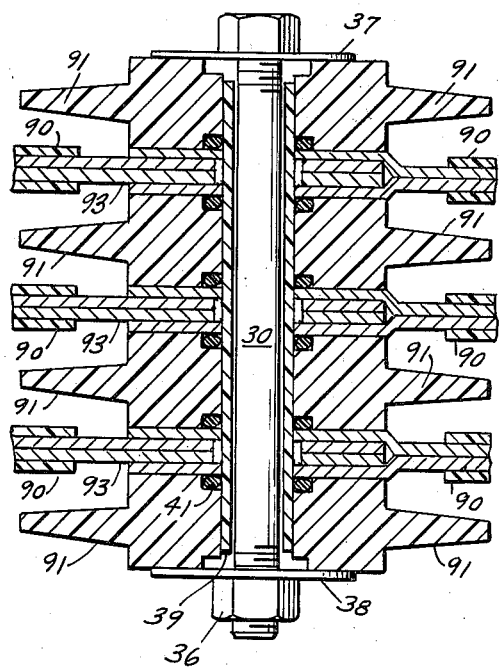
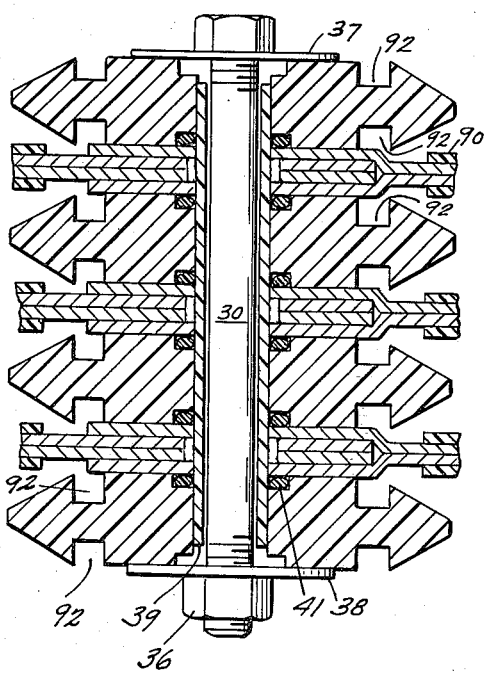
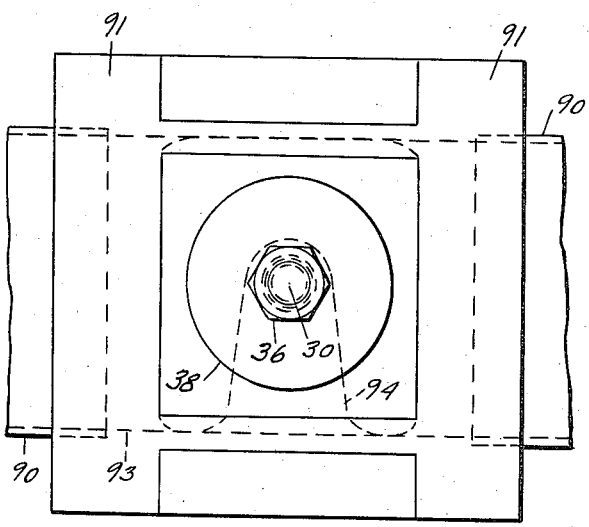
INVENTORS
JOHN B. CATALDO
NORMAN SHACKMAN
BY
Ostrolenk, Faber,
Gerb & Soffen
ATTORNEYS Sept. 17, 1963     J. B. CATALDO ETAL     3,104,276
THROUGH-BOLT JOINT FOR BUS DUCT
Filed June 2, 1959     6 Sheets-Sheet 6
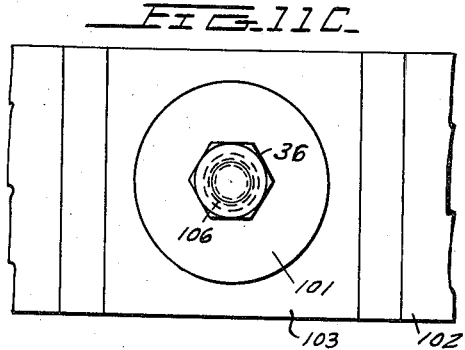
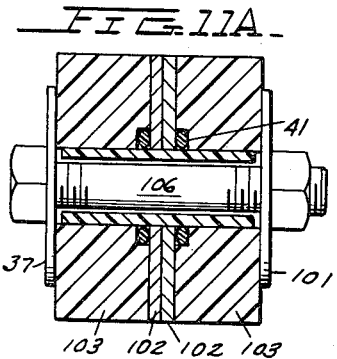
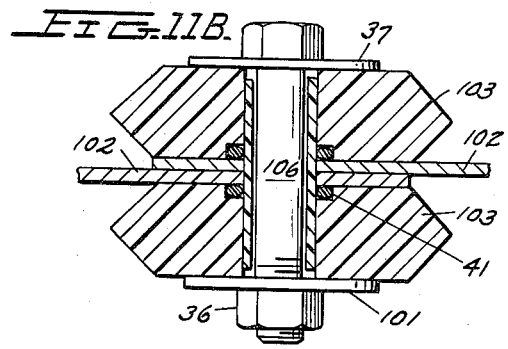
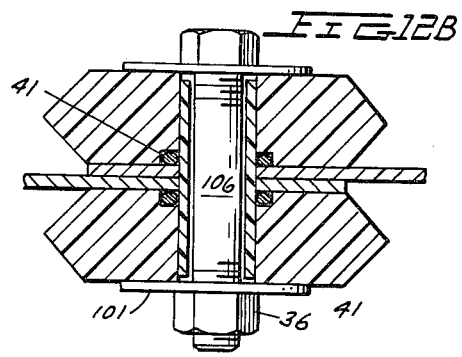
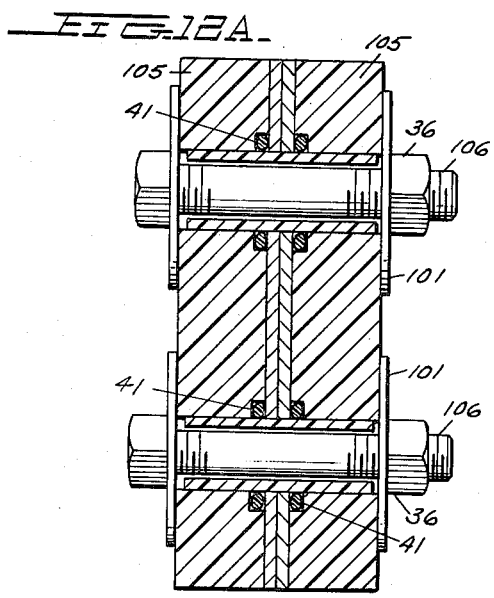
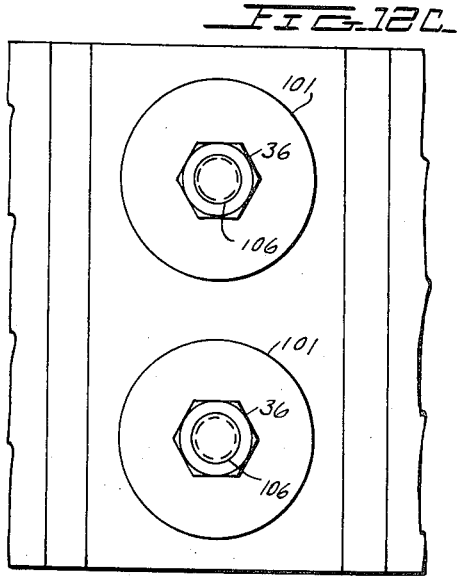
INVENTORS
JOHN B. CATALDO
NORMAN SHACKMAN
BY
ATTORNEYS

United States Patent Office 3,104,276
Patented Sept. 17, 1963

3,104,276
THROUGH-BOLT JOINT FOR BUS DUCT
John B. Cataldo, Birmingham, and Norman Shackman, Oak Park, Mich., assignors to I-T-E Circuit Breaker Company, Philadelphia, Pa., a corporation of Pennsylvania
Filed June 2, 1959, Ser. No. 817,548
15 Claims. (Cl. 174—88)

This application relates to electrical distribution systems in general and more particularly to the construction of a bus duct joint utilizing a common bolt means to simultaneously effect the connections between all of the buses of adjacent duct sections.

The effectiveness of a bus duct system in conducting electrical current is a function of the adequacy of its joint construction as well as the size and configuration of its bus bars. Since a bus duct run is usually comprised of many sections, with each section being typically ten feet in length, a great many joints must be properly made. If the distribution system is to perform adequately these joints must be constructed so that there will be a minimum opportunity for effecting an improper connection.

Most prior art bus duct joints are constructed by providing a degree of overlap of mating bus bars through which one or more bolts are inserted depending upon the size of the bus bars. Associated spring type washers are usually included to maintain contact pressures under different expansion conditions of heating and cooling. The number of bolt combinations, including nuts and washers, can become quite excessive in large sizes of bus duct. For example, a 1,000 ampere capacity bus duct containing four inch wide bus bars requires four bolts per bus bar. Thus, in a four conductor duct, a total of 16 such bolt combinations are necessary to effect electrical connection at each bus duct joint.

It is obvious that the time involved for installing and tightening these bolts is very lengthy and the probability of not tightening some bolts, or inadequately tightening others, becomes quite high. In addition, once a bus duct system has been installed and has been in operation, inspection and maintenance of these bolts also imposes time consuming and also ineffective procedures since the bus duct system will have to be deenergized if retightening of the bolts is required.

The fact that large numbers of bolts must be used at each joint has imposed design problems upon the whole bus duct structure since adequate room must be made available for the proper use of tools for installing and tightening the bolts. Adequate spacing between bus bars of different phases must also be provided in order to maintain electrical clearances. There must also be sufficient distances between bus bars to prevent contact during movement under short circuit conditions. These requirements for adequate clearances result in a voluminous joint section.

The instant invention overcomes the above noted problems of the prior art by providing a joint construction which utilizes a common bolt means to effect connection between the bus bars of adjacent duct sections. Insulation means is provided between adjacent bus bars to maintain electrical clearances. At least a portion of the insulation means is comprised of rigid members which provide mechanical strength during short circuit conditions.

In order to effect a compact bus duct design and also to achieve an efficient current distribution it is highly desirable to position the bus bars in close proximity to one another thereby also reducing the reactance losses of the bus. This may safely be accomplished by providing resilient sealing rings which are disposed within recesses of the rigid insulating members. Upon tightening of the joint bolt means, the isolating seals are compressed and thereby establish a substantially air tight seal between the portion of the insulation means defining a central opening and a rigid insulating tube which surrounds the bolt means. Such a seal creates extremely effective isolation between bus bars of different polarity so that it is possible to bring the bus bars in closer proximity than if standard unsealed oversurface and through-air clearances were to be utilized for electrical purposes around the area of the bolt means.

In one embodiment of the instant invention a particularly low resistance, cool operating joint is effected by utilizing a laminated bus bar construction. That is, within each duct section each of the bus bars are comprised of two laminates which are maintained in face to face abutting relationship. However, at one end of the bus bar the laminates are spread apart so as to form a pocket which will receive a bus bar of corresponding electrical phase of the adjacent bus duct section. As will be hereinafter explained in detail, this laminated construction lends itself particularly well to the formation of a joint sub-assembly which is secured to one end of the bus bar even before another bus section is moved adjacent thereto. In this connection it is to be noted that the end of the laminated bus bar which does not have the spread laminates is provided with an open ended slot which receives the bolt means and insulating sleeve.

Accordingly, a primary object of the instant invention is to provide a novel bus duct construction whereby the installation time of a joint is materially decreased by reducing the number of bolts that must be tightened in a joint containing bus bars of different polarities.

Another object is to provide a bus duct joint arrangement wherein the probability that a joint will be improperly made is reduced to a minimum.

Still another object is to provide a bus duct construction wherein the inspection of a joint for maintenance purposes is made simple and positive and wherein tightening of the joint can safely be made with the system energized.

A further object is to provide a bus duct joint construction wherein the space required to enclose and house the joint is kept to a minimum.

Still another object is to provide a bus duct joint construction wherein the bus bar spacings at the joint area are maintained at a minimum so that reactance losses of the bus are reduced.

Yet another object is to provide a bus duct joint construction wherein a maximum resistance is obtained against the mechanical forces which accompany high short circuit currents.

Another object is to provide a bus duct joint construction wherein all of the forces necessary for high contact pressure are provided by a common means acting directly against the bus bar surfaces.

Another object is to provide a bus duct joint construction whereby a cooler operating joint is made possible by increasing the bus bar contact overlapping areas by utilizing laminated bus bars.

These as well as other objects of the instant invention shall become readily apparent after reading the following description of the accompanying drawings in which:

FIGURE 1 is a perspective of a portion of a bus duct run in which the joints between duct sections are constructed in accordance with the teachings of the instant invention.

FIGURE 3 is an end view of the joint of FIGURE 2 looking in the direction of arrows 3—3 with the duct housing having been removed.

Figure 3B:
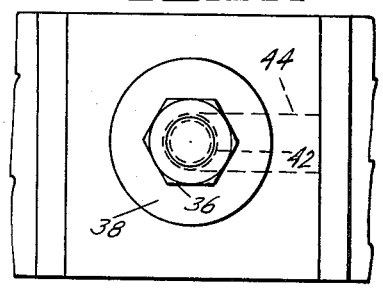
Figure 3C:
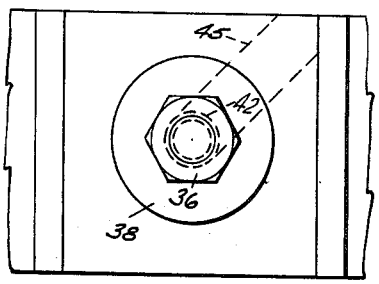
Figure 3:
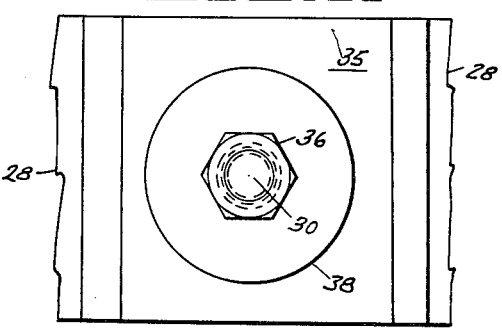
Figure 3D:
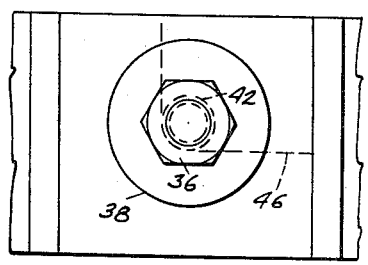

FIGURES 3A–3D are views similar to the view of FIGURE 3 illustrating modifications of the embodiment of FIGURE 3 accomplished by modifying the bus.

FIGURES 4A–4C are fragmentary cross-sections of modified joints accomplished by varying the construction of the insulators and shape of the isolating seals as well as positioning thereof.

Figure 5:
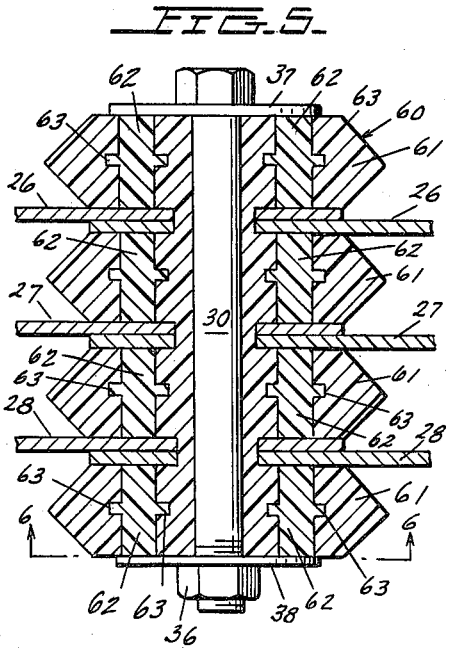

FIGURE 5 is a cross-section of a bus duct joint including rigid insulating inserts.

Figure 5A:
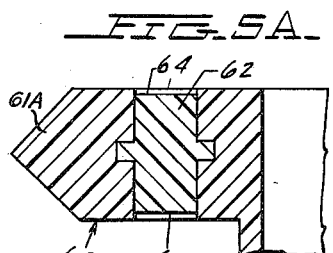
Figure 5B:
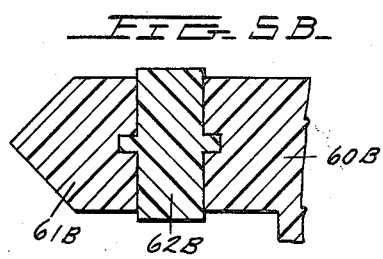

FIGURES 5A and 5B are fragmentary views of joint insulating means, similar to that illustrated in FIGURE 5, before installation in the joint.

FIGURES 6A–6D are end views of joints taken through line 6—6 of FIGURE 5 looking in the direction of the arrows 6—6 and illustrate various forms that the rigid insets may take.

FIGURE 7 is a cross-section of a joint formed between bus bars formed of two laminates.

FIGURE 8 is a cross-section of a joint utilizing splice plates to bridge the gaps between the ends of conductors of adjacent bus sections.

FIGURES 8A and 8B are fragmentary cross-sections illustrating modifications of the embodiment of FIGURE 8.

FIGURES 9 and 10 are cross-sections illustrating joint constructions, similar to that of FIGURE 7, for insulation covered bus bars.

FIGURE 9A is an end view of the joint of FIGURE 9.

FIGURES 11A and 11B are a transverse and a longitudinal cross-section, respectively, through a joint which joins two narrow bus bars. FIGURE 11C is an end view of the joint illustrated in FIGURES 11A and 11B.

FIGURES 12A and 12B are a transverse and a longitudinal cross-section, respectively, through a joint which joins two wide bus bars. FIGURE 12C is an end view of the joint illustrated in FIGURES 12A and 12B.

Now referring to the figures, bus duct run 20 comprises identical bus duct sections 21 joined end to end and is of the type disclosed in U.S. Patent No. 2,041,675 to W. H. Frank et al., entitled "Electrical Distribution System," which is assigned to the assignee of the instant invention. Briefly, each bus duct section 21 comprises an elongated housing constructed of side channel members 22, 23 joined at the flanges thereof by top and bottom plates 24, 25, respectively, which are secured by riveting or other suitable means. A plurality of elongated bus bars 26–28 are disposed within the housing in spaced parallel relationship and are insulated from the housing as well as each other by means well known to the art. Doors 29 are provided to cover openings in the channel members 22, 23 of the housing through which access may be had to bus bars 26–28 for tapping electric power therefrom.

Top and bottom plates 24, 25 extend beyond channels 22, 23 to the right and left, respectively, so as to overlap adjacent housing for mechanical securement of adjacent duct sections 21. Electrical connections between bus bars 26–28 of adjacent duct sections 21 is accomplished by a common bolt means 30 which is accessible externally of the housing through opening 31 as will be explained with reference to FIGURES 2–3D.

Bus bars 26–28 are disposed in face to face relationship commonly known as a ladder type arrangement. The bus bars 26–28 in one duct section 21 are each connected to a different phase of a power source and are also connected to bus bars 26–28 of the adjacent duct section 21 by overlapping the end portions thereof. The spacing between bus bars 26–28 at the joint and the mechanical strength of the joint are provided by the cooperation of flat rigid insulators 32–35 and the common bolt means comprising bolt 30 and nut 36.

Insulator 33 is interposed between bus bars 26, 27 while insulator 34 is interposed between bus bars 27, 28. Insulator 32 is disposed above bus bars 26 and insulator 35 is disposed below bus bars 28. Aligned openings are provided in bus bars 26–28 and insulators 32–35 within which are disposed the body of bolt 30. Flat washer 37 is interposed between the head of bolt 30 and insulator 32 while spring washer 38 is interposed between nut 36 and insulator 35.

Circular portions are formed in insulators 32–35, adjacent to insulating tube 39, which form recesses 40 in which are disposed rings 41 of resilient insulating material. When bolt 30 and nut 36 are tightened resilient rings 41 are compressed and thereby forced into tight engagement with insulating tube 39 so as to establish a substantially air tight seal between the hole in each insulator 32–35 and insulating tube 39. Such seals create extremely effective electrical isolation between bus bars 26–28 of different polarities. The seal construction makes it possible to bring bus bars of different polarity in closer proximity than if ordinary unsealed oversurface and through-air clearances are observed for electrical purposes around the bolt area.

Figure 3A:
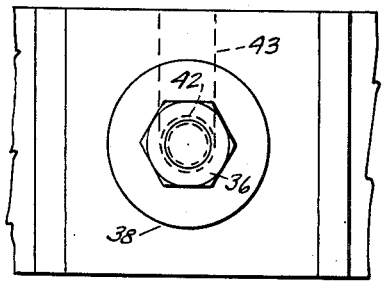
Figure 2:
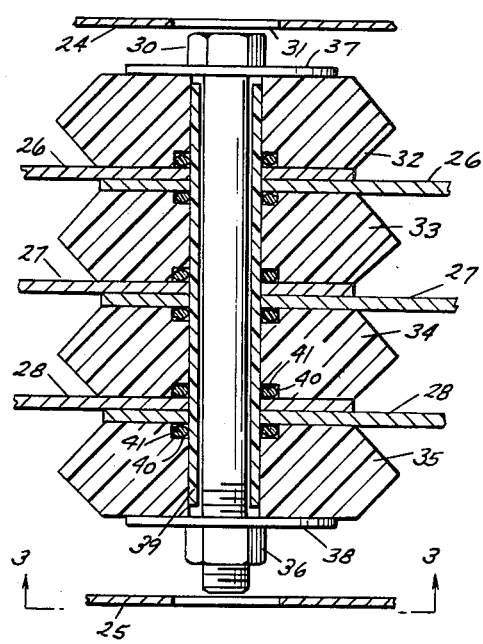
FIGURE 2 is a cross-section of a bus duct joint taken through line 2—2 of FIGURE 1 looking in the direction of the arrows 2—2.

The circular cutouts 40 in insulators 32–35 to receive the resilient insulating rings 41 can be of any shape. The only requirement is that cutouts 40 be of such a configuration that vertical compression of the rings 41 provides an effective seal against insulating tube 39. In FIGURE 2 two seals 41 are provided per insulator except for the top and bottom insulators 32, 35 where only one seal 41 is provided per insulator. In the modification of FIGURE 4A an additional insulator 47 is provided adjacent to washer 37. In a similar manner an additional insulator (not shown) may be provided adjacent to spring washer 38.

FIGURE 4B illustrates an alternate placement of insulating rings 41. In this embodiment each solid insulator 48 is formed of complementary abutting members 49A, 49B. Cutouts in each of the members 49A, 49B cooperate to form a recess 50 wherein seal 41 is disposed.

In the embodiment of FIGURE 4C sealing is accomplished by means of grommets 51 which are placed in the holes of mating bus bars which receive the insulating tube 39 and bolt 30. This embodiment requires a modified construction of the insulator cutout 50 to receive grommet 51.

In the joint of FIGURES 2 and 3 holes are punched in both ends of each bus bar to receive bolt 30 and tube 39. It is often preferable to construct each bus bar with a hole in one end and an open ended slot in the other end. As illustrated in FIGURES 3A–3D the bus bars entering the joint from the right are provided with holes 42 while the bus bar entering the joint from the left are provided with open ended slots extending from the center of the bus bar. Slots 43–45 are elongated while slot 46 is in the form of a rectangular notch cut in the corner of the bus bar. Slot 43 extends at right angles to the longitudinal axis of the bus, slot 44 extends along the longitudinal axis, and slot 45 extends at an angle of approximately 45° with respect to the longitudinal axis.

With slots formed in the bus bars, they may be slipped into position after the bolt 30 and insulators 32–35 are secured to the bus bars of the mating duct section. In this connection, it is to be noted that the edges of insulators 32–35 are sloped from both faces thereof so as to form wide-mouthed openings for the ready entrance of the slotted ends of bus bars 26–28.

Figure 6A:
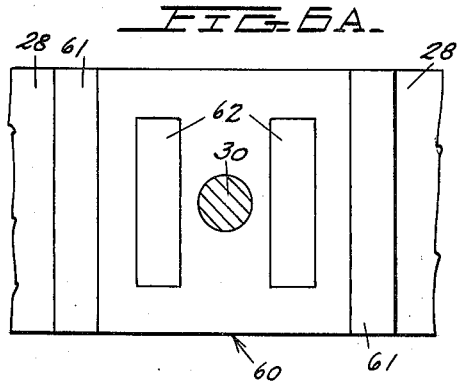
Figure 6B:
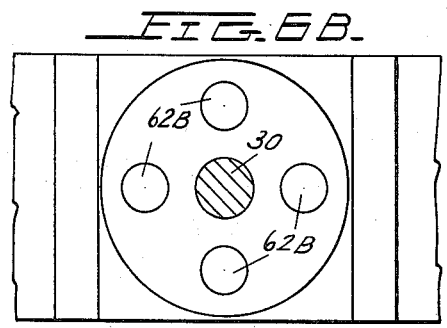
Figure 6C:
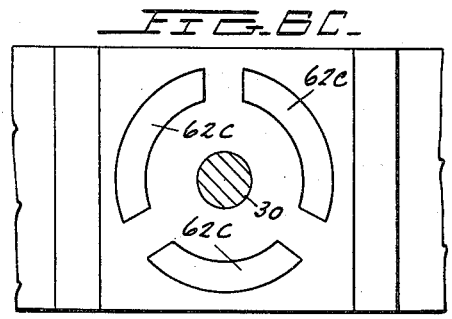
Figure 6D:
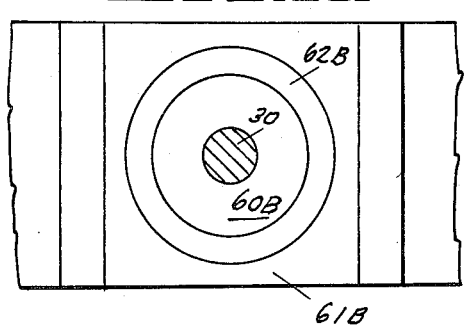

Now referring more particularly to FIGURES 5–6D, the joint insulating means comprises a unitary molding 60 of resilient plastic material in the form of an enlarged grommet having wings 61 to enclose bus bars 26–28. A central opening is provided through molding 60 to receive bolt 30. Inserts 62 of rigid insulating material are placed in wings 61 with lateral projections 63 of the inserts 62 being received by suitable formations in molding 60 for retention of inserts 62.

The rigid inserts 62 combine with bus bars 26-28 to form a rigid stack thereby obtaining contact pressure when bolt 30 is tightened. As illustrated in FIGURE 5A, before the joint is made the wings 61A of resilient molding 60 extend beyond the tops 64 and bottom 65 of rigid inserts 62. If it is desired that contact pressure be transmitted through the rigid inserts only, the relative dimensions of the component parts may be modified as illustrated in FIGURE 5B. The wings 61B (FIGURE 5B) are made shorter than wings 61A of FIGURE 5A so that inserts 62B extend beyond the top and bottom surfaces of wings 61B.

The number and size of rigid inserts 62 that should be placed in each wing 61 is a function of the area of bus bar engagement that is desired at the joint. There should be at least two inserts 62, one on each side of bolt 30, as in FIGURE 6A which illustrates rectangular inserts. FIGURE 6B illustrates a configuration of four circular inserts 62B while FIGURE 6C illustrates a configuration of three curved inserts 62c.

The insert 62B of FIGURE 6D comprises a single member which surrounds the grommet opening for bolt 30. A wing 61B separate and apart from grommet 60B is placed at the periphery of insert 62B. This construction provides the maximum area of contact engagement.

In the embodiment of FIGURE 7 the bus bars are laminated. That is, bus bars 70-72 coming from the left are each comprised of two laminates 70a, 70b; 71a, 71b; 72a, 72b, respectively, either welded together or otherwise maintained with their faces abutting. The bus bars 73-75 coming from the right are also comprised of two laminates. The laminates at the left ends of each bus bar are spread apart to form a pocket which receives the right end of the mating bus bars.

The arrangement of FIGURE 7 has the advantage of being able to mount the joint means to the spread apart left end of the bus bars with the joint means parts automatically being maintained in position to receive the right ends of the bus bars of the adjacent duct section. In this connection the right ends of the bus bars are provided with open ended slots of the type illustrated in FIGURES 3A-3D.

The laminated bus bar construction of FIGURE 7 results in an effective decrease in contact resistance. Also, half the bus bar current will be carried through each bus bar overlap in contrast to the full current through a single overlap as in the embodiment of FIGURE 1. Since heating is a function of the square of the current, the structure of FIGURE 7 will develop one-half the heat developed by the structure of FIGURE 1, hence, is more efficient. Further, lower contact pressures may be employed with a resultant decrease in the size and cost of nuts, bolts, and spring washers.

In the embodiment of FIGURE 8 the joint is comprised of insulators, tubes, and seals as previously described in connection with FIGURE 2. However, instead of overlapping the bus bars in the joint assembly, separate laminate or splice plates 76 are secured to both sides of insulators 32-35 by means of flat head screws 77. The ends of the conductors 78-83 entering the joint remain flat since the overlap is made with splice plates 76. The conductors 78-83 enter the joint assembly up to insulating tube 39.

In application, an assembly is made part of one end of one set of bus bars so as to be in position to receive the flat ends of the mating conductors. Alternately, both sets of conductors can be left free, and a sub assembly package of insulators, splice plates, bolts, etc. is made up to be inserted between the bus bars 78-83 after they have been brought into operative position. To maintain the elements of the sub assembly in spaced apart operative position, a separate spacer 84 (FIGURE 8B) of insulating material is placed between adjacent insulators 32-35 in position to retain isolating rings 41 in recesses 40. In the alternative grommet type isolating seals 85 can be employed (FIGURE 8A).

For the various types of conductor ends for joint overlaps that have previously been described, it is obvious that they can be utilized in many varied combinations. For instance, the laminated bars of FIGURE 8 can be solid bars. A single splice plate 76 can be utilized rather than the double type arrangement illustrated in FIGURE 8 and the splice plate can even be made a part of or be secured to one of the mating conductors. Thus, no slots will be required and flexibility in the direction of entrance of bus bars into the joint is materially increased.

FIGURES 9 and 10 illustrate joints for bus ducts in which the bus bars are covered with a continuous insulation as explained in copending application Serial No. 772,814, filed November 10, 1958, with John B. Cataldo as the inventor, entitled "Clamped Busway Structure," and assigned to the assignee of the instant invention. The bus bar insulation covering 90 is stripped at the ends and the joint is otherwise formed as described in connection with the embodiment of FIGURE 7. The sealed structure in the bolt, achieved by seals 41, provides for electrical isolation internal to the joint around the bolt holes. Externally, however, at the points where the bus bars enter the joint, additional barriers are interposed to increase the otherwise small clearances. This is effectively accomplished by extending the ends of the joint insulator as at 91 (FIGURE 9) beyond the bared portions of the bus bars. By reducing the thickness of end portions 91, a pocket is obtained between adjacent insulators into which the bus bar insulation 90 extends. The side portions of insulator extensions 91 are tapered or sloped to facilitate bus bar entrance.

In the modification of FIGURE 10 notches 92 are formed in the insulator extensions to increase the over surface electrical spacings between bus bars. The design shapes of the sides and ends of the insulators may be of any desired contour depending upon the use to which they are put from an electrical clearance standpoint. It is to be noted that each laminated bar 93 entering the joint from the left is provided with a transverse open ended notch 94 as best seen in FIGURE 9A.

While the description of the various joint structures of this invention has been concerned with a single bolt through all bars, there are certain advantages accruing in the addition of more bolts in the same generic structure for very wide bars. Inherent in an efficient joint is an even distribution of pressure throughout the entire contact area. In the structure of FIGURES 11A-11C, this is accomplished by a geometric balance between the size of the spring-washer 101, the width of the bus bars 102, the length of bar overlap and insulators 103. In a 2" wide bar, for example, inspection shows that a fairly even distribution of contact pressures will be obtained.

If the same condition of pressure distribution is desired in, say a 4" bar, then these dimensions must be materially increased in order to utilize a single bolt construction. The four inch overlap requires that the joint be made relatively long, and the larger washer and associated bolt and nut contributes to increased costs.

A more practical and economic solution, and one that is just as effective, lies in employing two bolts as shown in FIGURES 12A-12C. In theory, the idea encompasses two 2" bars side by side. The overlap can remain the same for 2" bars. Wider insulators 105 are required, but designed to accept two bolts 106. Washers, nuts, and seals are the same as for the 2" bars. Hence economy is further achieved through standardization of parts.

For extremely wide bars, it is conceivable that even more than two bolts can be utilized under the same principle. The preferred practice for wider bars is to employ two or more bolts.

In the general construction of the joint of this invention, it is clear that where spacings between bars are adequate for nominal electrical clearances, sealing insulating rings may not be necessary. If close tolerances are held between the tube around the bolt and the holes in the insulators, satisfactory performance against electrical leakage and tracking will be obtained. However, the addition of sealing rings greatly improves the joint safety and life by preventing the transmission and accumulation of dust and other particles in the joint area between the bars of different phases.

Although we have here described preferred embodiments of our novel invention, many variations and modifications will now be apparent to those skilled in the art, and we therefore prefer to be limited, not by the specific disclosure herein, but only by the appended claims.

We claim:

1. In combination a first, a second, a third and a fourth bus bar and joint mean for effecting electrical connections of said first and said second bus bars to said third and said fourth bus bars, respectively; said joint means being comprised of an insulating means at least a first portion of which is rigid and positioned in the region intermediate electrically isolated ones of said bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means extending through an opening in said insulating means; said bolt means when tightened urging said insulation means first portion against said bus bars thereby establishing contact pressure for the electrical connections between the respective ones of said bus bars; an insulating tube disposed within said insulating means opening and interposed between said bolt means and said insulating means; a deformable seal means disposed in recesses of said insulating means; said recesses communicating with said opening; said seal means surrounding said insulating tube in tight engagement therewith caused by deformation of said seal means; said seal means when relaxed being loosely fitted to said insulating tube.

2. In combination a first, a second, a third and a fourth bus bar and joint mean for effecting electrical connections of said first and said second bus bars to said third and said fourth bus bars, respectively; said joint means being comprised of an insulating means at least a first portion of which is rigid and positioned in the region intermediate electrically isolated ones of said bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means extending through an opening in said insulating means; said bolt means when tightened urging said insulation means first portion against said bus bars thereby establishing contact pressure for the electrical connections between the respective ones of said bus bars; an insulating tube disposed within said insulating means opening and interposed between said bolt means and said insulating means; a deformable seal means disposed in recesses of said insulating means; said recesses communicating with said insulating means opening; said seal means surrounding said insulating tube; said seal means comprising a grommet means individual to each pair of electrically connected bus bars.

3. In combination a first, a second, a third and a fourth bus bar and joint means for effecting electrical connections of said first and said second bus bars to said third and said fourth bus bars, respectively; said joint means being comprised of an insulating means at least a first portion of which is rigid and positioned in the region intermediate electrically isolated ones of said bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means extending through an opening in said insulating means; said bolt means when tightened urging said insulation means first portion against said bus bars thereby establishing contact pressure for the electrical connections between the respective ones of said bus bars; a grommet means individual to each pair of electrically connected bus bars; said grommet means surrounding said bolt means and being entered into recesses of said insulating means; said recesses communicating with said insulating means opening.

4. In combination a first, a second, a third and a fourth bus bar and joint means for effecting electrical connections of said first and said second bus bars to said third and said fourth bus bars, respectively; said joint means being comprised of an insulating means at least a first portion of which is rigid and positioned in the region intermediate electrically isolated ones of said bus bars to establish spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means extending through an opening in said insulating means; an insulating tube disposed within said insulating means opening and interposed between said bolt means and said insulating means; a splice plate individual to each pair of electrically connected bus bars; each of said splice plates bridging an end to end gap between its associated bus bars; said insulating tube extending through aligned openings in each of said splice plates; said bolt means when tightened urging said insulation means first portion against said splice plate thereby establishing contact pressure for the electrical connections between the respective ones of said bus bars.

5. In combination a first, a second, a third and a fourth bus bar and joint means for effecting electrical connections of said first and said second bus bars to said third and said fourth bus bars, respectively; said joint means being comprised of an insulating means at least a first portion of which is rigid and positioned in the region intermediate electrically isolated ones of said bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means extending through an opening in said insulating means; said bolt means when tightened urging said insulation means first portion against said bus bars thereby establishing contact pressure for the electrical connections between the respective ones of said bus bars; an insulating tube disposed within said insulating means opening and interposed between said bolt means and said insulating means; said first and said second bus bars having aligned openings; said third and said fourth bus bars having open ended slots extending transverse to the axes of the respective bus bars; said insulating tube extending through said aligned openings and said slots; a deformable seal means disposed in recesses of said insulating means; said recesses communicating with said opening; said seal means surrounding said insulating tube, and in tight engagement therewith caused by deformation of said seal means.

6. In combination a first, a second, a third and a fourth bus bar and joint means for effecting electrical connections of said first and said second bus bars to said third and said fourth bus bars, respectively; said joint means being comprised of an insulating means at least a first portion of which is rigid and positioned in the region intermediate electrically isolated ones of said bus bars and in direct contact with at least one bus bar from the respective ones of said electrically connected bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means and an insulating tube through which said bolt means extends; said tube extending through an opening in said insulating means; each of said first and said second bus bars being constructed of a first and a second laminate which abut in face-to-face relationship for a majority of the lengths thereof; said first and said second laminates including spread apart portions at a first end thereof cooperating to form a pocket; said third and said fourth bus bars being entered into the pockets of said first and said second bus bars, respectively; said insulating tube extending through aligned openings in said third and said fourth bus bars and in the spread apart laminate portions of said first and said second bus bars; said bolt means when tightened urging said insulation means first portion against the pocket formed by said spread apart portions; said pocket being urged against said third and fourth bus bars entered therein, thereby establishing contact pressure for the electrical connections between the respective ones of said bus bars.

7. In combination a first, a second, a third and a fourth bus bar and joint means for effecting electrical connections of said first and said second bus bars to said third and said fourth bus bars, respectively; said joint means being comprised of an insulating means at least a first portion of which is rigid and positioned in the region intermediate electrically isolated ones of said bus bars and in direct contact with at least one bus bar from the respective ones of said electrically connected bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means and an insulating tube through which said bolt means extends; said tube extending through an opening in said insulating means; each of said first and said second bus bars being constructed of a first and a second laminate which abut in face-to-face relationship for a majority of the lengths thereof; said first and said second laminates including spread apart portions at a first end thereof cooperating to form a pocket; said third and said fourth bus bars being entered into the pockets of said first and said second bus bars, respectively; said bolt means when tightened urging said insulation means first portion against the pocket formed by said spread apart portions; said pocket being urged against said third and fourth bus bars entered therein, thereby establishing contact pressure for the electrical connections between the respective ones of said bus bars; said spread apart portions of said laminates of both said first and said second bus bars having aligned openings therethrough; said third and said fourth bus bars having open ended slots; said insulating tube extending through said aligned openings and said slots.

8. In combination a first, a second, a third and a fourth bus bar and joint means for effecting electrical connections of said first and said second bus bars to said third and said fourth bus bars, respectively; said joint means being comprised of an insulating means at least a first portion of which is rigid and positioned in the region intermediate electrically isolated ones of said bus bars, and in direct contact with at least one bus bar from the respective ones of said electrically connected bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means extending through an opening in said insulating means; said bolt means when tightened urging said insulation means first portion against said bus bars thereby establishing contact pressure for the electrical connections between the respective ones of said bus bars; an insulating tube disposed within said insulating means opening and interposed between said bolt means and said insulating means; a deformable seal means individual to each of said bus bars; each of said seal means surrounding said insulating tube and being disposed within recesses of said insulating means; said recesses communicating with said insulating means opening; said recesses being partially closed off by said bus bars.

9. In combination a first, a second, a third and a fourth bus bar and joint means for effecting electrical connections of said first and said second bus bars to said third and said fourth bus bars, respectively; said joint means being comprised of an insulating means at least a first portion of which is rigid and positioned in direct contact with at least one bus bar from the respective ones of said electrically connected first and second bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means extending through an opening in said insulating means; each of said first and said second bus bars being constructed of a first and a second laminate which abut in face-to-face relationship for a majority of the lengths thereof; said first and said second laminates including spread apart portions at a first end thereof cooperating to form a pocket; said third and said fourth bus bars being entered into the pockets of said first and said second bus bars, respectively; said bolt means when tightened urging said insulation means first portion against the pocket formed by said spread apart portions; said pocket being urged against said third and fourth bus bars entered therein, thereby establishing contact pressure for the electrical connections between the respective ones of said bus bars; an insulation means providing a thin covering individual to each of said bus bar; the first recited of said insulating means also including a first and a second tapered side portion extending beyond the pocket portions of said first and second bus bars, and in opposite directions somewhat parallel to the longitudinal axes of said bus bars.

10. In combination, a first, a second, a third and a fourth bus bar and joint means for effecting electrical connections of said first and said second bus bars to said third and said fourth bus bars, respectively; said joint means being comprised of an insulating means at least a first portion of which is rigid and positioned in direct contact with at least one bus bar from the respective ones of said electrically connected first and second bus bars to establish the minimum spacing in the region of said joint means between said first and said second bus bars as well as between said third and said fourth bus bars;

said first and third bus bars and said second and fourth bus bars including cooperating portions adjacently positioned to be urged into good electrical engagement by said insulating means first portion; said joint means also including a bolt means extending through an opening in said insulating means; each of said first and said second bus bars being constructed of a first and a second laminate which abut in face-to-face relationship for a majority of the lengths thereof; said first and said second laminates including spread apart portions at a first end thereof cooperating to form a pocket; said third and fourth bus bars being entered into the pockets of said first and said second bus bars, respectively; said bolt means when tightened urging said insulation means first portion against the pocket formed by said spread apart portions; said pocket being urged against said third and fourth bus bars entered therein, thereby establishing contact pressure for the electrical connections between the respective ones of said bus bars; an insulation means providing a thin covering individual to each of said bus bars; the first recited of said insulating means also including a first and a second tapered side portion extending beyond the pocket portions of said first and second bus bars, and in opposite directions somewhat parallel to the longitudinal axes of said bus bars; the first recited of said insulating means having notches formed therein operatively positioned to increase over surface electrical spacings between said bus bars.

11. The sub-assembly comprising a first and a second bus bar each constructed of a first and a second laminate which abut in face-to-face relationship for a majority of the lengths thereof; said first and said second laminates including spread apart portions at a first end thereof cooperating to form a pocket; a second end of one of said bus bars being entered into the pocket formed at the first end of the other of said bus bars; a joint means secured to said bus bars at said first end including an insulating means having a rigid portion positioned in direct contact with said spread apart portions of said bus bars to establish the minimum spacing between said bus bars in the region of said joint means; said first and second bus bars including cooperating portions positioned to be urged into good electrical engagement by said insulating means; said joint means also including a bolt means extending through an opening in said insulating means and also through aligned openings in said spread apart portions of said laminates; said bolt means, when tightened, urging said insulating means rigid portions against said spread apart portions; said insulating means including a second portion interposed adjacent said spread apart portions and about said bolt means, said second portion extending from the intersection region of said bolt means and said spread apart portions in the axial direction of said bolt means thereby providing increased electrical isolation.

12. The sub-assembly of claim 11 wherein said bus bar second ends having slots therein constructed and positioned to receive bolt means of bus bars adjacent said second ends.

13. In combination a first, a second, a third and a fourth bus bar and joint means for effecting electrical connections of said first and said second bus bars to said third and fourth bus bars, respectively; said joint means being comprised of an insulating means at least a first portion of which is rigid and positioned in the region intermediate electrically isolated ones of said bus bars and in direct contact with at least one bus bar from the respective ones of said electrically connected bus bars to establish the minimum spacing in the region of said joint means between said first and said second bus bars as well as between said third and said fourth bus bars; said first and third bus bars and said second and fourth bus bars including cooperating portions adjacently positioned to be urged into good electrical engagement by said insulating means first portion; said joint means also including a bolt means extending through an opening in said insulating means; said bolt means when tightened urging said insulation means first portion against said bus bars thereby establishing contact pressure for the electrical connections between the respective ones of said bus bars; an insulating tube disposed within said insulating means opening and interposed between said bolt means and said insulating means; said first and said second bus bars having aligned openings; said third and said fourth bus bars having open-ended slots; said insulating tube extending through said aligned openings and said slots; said insulating means including a second portion interposed adjacent selected ones of said bus bars and about said insulated tube; said second portion extending from the intersection of said insulated tube and said selected bus bar and in the axial direction of said insulated tube, thereby providing increased electrical isolation.

14. The combination as set forth in claim 13, wherein said second portion includes an annular section coaxial with said bolt means and extending into the bolt-receiving opening of its associated bus bar.

15. The combination as set forth in claim 13, wherein said insulating means includes an extending portion positioned beyond said cooperating portions of electrically connectible bus bars; said extending portion extending generally between electrically isolated ones of said bus bars, and in the axial direction of said insulated tube, thereby providing increased electrical isolation between adjacent non-connected bus bars.

References Cited in the file of this patent

UNITED STATES PATENTS

| | | |
|---|---|---|
| 2,043,796 | Frank | June 9, 1936 |
| 2,057,266 | Rippere | Oct. 13, 1936 |
| 2,174,375 | Beggs | Sept. 26, 1939 |
| 2,350,601 | Frank et al. | June 6, 1944 |
| 2,462,993 | Peters et al. | Mar. 1, 1949 |
| 2,732,423 | Morrison | Jan. 24, 1956 |
| 2,897,472 | O'Brien | July 28, 1959 |
| 2,922,834 | Cavanagh | Jan. 26, 1960 |
| 2,924,644 | Cox | Feb. 9, 1960 |
| 3,031,521 | Krauss et al. | Apr. 24, 1962 |

FOREIGN PATENTS

| | | |
|---|---|---|
| 123,336 | Austria | Feb. 15, 1931 |
| 564,349 | Belgium | May 16, 1958 |

OTHER REFERENCES

Germany, L15664/d/21c, July 26, 1956.